United States Patent [19]

Yoneya et al.

[11] Patent Number: 5,061,045

[45] Date of Patent: Oct. 29, 1991

[54] LIQUID CRYSTAL LIGHT MODULATION DEVICE AND LIQUID CRYSTAL LIGHT MODULATION APPARATUS

[75] Inventors: Makoto Yoneya, Hitachi; Katsumi Kondo, Katsuta; Tetsuya Ohashi, Hitachi; Motomi Odamura; Teruo Kitamura, both of Katsuta, all of Japan

[73] Assignee: Hitachi, Ltd., Tokyo, Japan

[21] Appl. No.: 398,541

[22] Filed: Aug. 25, 1989

[30] Foreign Application Priority Data

Sep. 2, 1988 [JP] Japan ................. 63-218354

[51] Int. Cl.$^5$ .............................. G02F 1/133
[52] U.S. Cl. ........................ 359/56; 359/93; 359/94
[58] Field of Search ............ 350/347 E, 347 R, 350 S, 350/337, 334

[56] References Cited

U.S. PATENT DOCUMENTS

| | | | |
|---|---|---|---|
| 4,443,065 | 4/1984 | Funada et al. | 350/347 E |
| 4,614,609 | 9/1986 | Inoue et al. | 350/350 R |
| 4,820,444 | 4/1989 | Inukai et al. | 350/350 S |

FOREIGN PATENT DOCUMENTS

| | | | |
|---|---|---|---|
| 0309959 | 3/1989 | European Pat. Off. | 350/350 S |
| 0176623 | 10/1983 | Japan | 350/350 S |

*Primary Examiner*—Rolf Hille
*Assistant Examiner*—Tan Ho
*Attorney, Agent, or Firm*—Antonelli, Terry Stout & Kraus

[57] ABSTRACT

The present invention provides a liquid crystal light modulation device which has a cell comprising a pair of substrates at least one of which is transparent and which have electrodes and are opposed through a spacer, a ferroelectric liquid crystal layer which is enclosed in said cell and which has a phase series where a nematic phase (N*phase) or an isotropic phase (I phase) is shown on a just higher temperature side of a ferroelectric phase (smectic C* phase, Sc* phase) and two polarizing plates which sandwich the cell therebetween, liquid crystal molecules at one interface between the liquid crystal layer and the substrate being fixed to the substrate more weakly than liquid crystal molecules at the other interface between the liquid crystal and the substrate wherein the liquid crystal molecule weakly fixed is fixed to such an extent that inversion of spontaneous polarization of the liquid crystal molecule occurs upon application of an electrical field to the liquid crystal layer through the electrodes, orientation of the liquid crystal molecule at one interface and orientation of the liquid crystal molecule at the other interface can be either the state (a) of being nearly parallel to each other or the state (b) of crossing each other by the inversion of the spontaneous polarization and the two polarizing plates are arranged so that light transmittance is lower at the state (a) than at the state (b).

9 Claims, 5 Drawing Sheets

LIQUID CRYSTAL LIGHT MODULATION DEVICE AND LIQUID CRYSTAL LIGHT MODULATION APPARATUS

BACKGROUND OF THE INVENTION

The present invention relates to a light modulation device in which a ferroelectric liquid crystal composition is used and a liquid crystal light modulation apparatus and in particular to a liquid crystal light modulation device and apparatus suitable for display devices which electrically control optical properties.

The prior art discloses a device which is imparted with contrast by a guest-host mode involving incorporation of a dye and which uses a liquid crystal material which directly changes from nematic N* phase to smectic Sc* phase and has a large tilt and has been proposed as a ferroelectric liquid crystal display device having a memory property with a cell large in cell thickness (which refers to the thickness of a liquid crystal layer sandwiched between two substrates hereinafter) which is easily mass-produced. (Japanese Patent Kokai No. 62-27721).

The above-mentioned prior art has problems in display quality, and it is especially difficult to increase contrast ratio. The prior art employs the guest-host mode which incorporates a dye as a guest as a means to impart contrast owing to the large tilt of the liquid crystal material. As methods for increasing contrast ratio in this guest-host mode, there have been known, for example, a method of increasing the concentration of dye to be incorporated and a method of increasing cell thickness. However, these methods still suffer from several problems. In the former method, the dye concentration cannot be increased very much because of deterioration of the liquid crystal. In the latter method, increase of driving voltage or reduction of response time are problems. For these reasons, according to the above guest-host mode, it has been difficult to obtain a contrast of, for example, higher than 10.

In addition to the above guest-host mode, a birefringence mode which uses two polarization plates has been known for imparting high contrast to liquid crystal devices. According to this method, a contrast ratio of, for example, 10 or higher which is higher than that obtained by the guest-host mode can be easily obtained by using a liquid crystal material of small tilt (theoretically 22.5° as an optimum value).

However, according to the conventional birefringence mode, cell thickness must be decreased to about 1-$\mu$m in order to make display of high contrast ratio with black and white colors. In this case there is the problem that incorporation of dust may cause short-circuiting between upper and lower electrodes and production thereof is difficult. Furthermore, in the case of such a thin cell, the presence of even a slight unevenness in gap brings about unevenness in density and color so that it is very difficult to obtain a uniform display.

On the other hand, in order to reduce unevenness in color in the birefringence mode, a method has been proposed according to which a structure of a ferroelectric liquid crystal molecule twisted in the direction of cell thickness is stabilized by twisting the rubbing direction of upper and lower substrates and a bright state is displayed by a twisted structure with no electrical field applied and a dark state is displayed by uniform state under application of an electrical field. (Japanese Patent Kokai No. 62-50735).

However, this method cannot afford memory and cannot make display using matrix electrodes.

As explained above, according to the conventional methods, it has been impossible to develop a stable memory and to allow a high contrast ratio and high contrast ratio with black and white colors to be compatible with each other with a thick cell (3 $\mu$m or more) which can be easily produced and can provide a uniform display.

SUMMARY OF THE INVENTION

An object of the present invention is to provide a ferroelectric liquid crystal light modulation device and a liquid crystal light modulation apparatus which allow high contrast ratio and black and white colors to be compatible with each other in relation to a thick cell (3 $\mu$m or more) imparted with a stable memory.

DETAILED DESCRIPTION OF THE INVENTION

The above object can be accomplished by the inventions explained below.

The first invention is a liquid crystal light modulation device which has a cell comprising a pair of substrates at least one of which is transparent and which have electrodes and are opposed through a spacer, a ferroelectric liquid crystal layer which is enclosed in the above cell and which has a phase series where a nematic phase (N* phase) or an isotropic phase (I phase) is shown on a just higher temperature side of ferroelectric phase (smectic C* phase, Sc* phase) and two polarization plates which sandwich the cell therebetween, the liquid Crystal molecules being fixed more weakly at one interface between the liquid crystal and one of the substrates than at the other interface, characterized in that the liquid crystal molecules are fixed to such an extent that inversion of spontaneous polarization of the liquid crystal molecules occurs upon application of an electrical field to the liquid crystal layer through the electrodes, orientation of the liquid crystal molecules at one interface and orientation of the liquid crystal molecules at the other interface can be either the state (a) of being nearly parallel to each other or the state (b) of crossing each other by the inversion of the spontaneous polarization. The two polarizers which sandwich the cell are arranged so that light transmittance is lower at the state (a) than at the state (b).

The second invention is a liquid crystal light modulation apparatus which has a cell comprising a pair of substrates at least one of which is transparent and which have electrodes and are opposed through a spacer, a ferroelectric liquid crystal layer which is enclosed in the above cell and which has a phase series where a nematic phase (N* phase) or an isotropic phase (I phase) is shown on a just higher temperature side of a ferroelectric phase (smectic C* phase, Sc* phase), two polarization plates which sandwich the cell therebetween, and means to apply a given electrical field to given picture elements in the liquid crystal layer through the electrodes, the liquid crystal molecules being fixed to the substrate more weakly at one interface between the liquid crystal and one of the substrates than at the other interface, characterized in that the liquid crystal molecules more weakly fixed are fixed to such an extent that inversion of spontaneous polarization of the liquid crystal molecules occurs upon application of electrical field to the liquid crystal layer through the electrodes, orientation of the liquid crystal molecules at one interface and orientation of the liquid crystal molecule at another interface can be either the state (a) of being nearly parallel to each other or the state (b) of crossing each other by the inversion of the spontaneous polarization. The two polarization plates which sandwich the cell are arranged so that light transmittance is lower at the state (a) than at the state (b).

Figure 3:
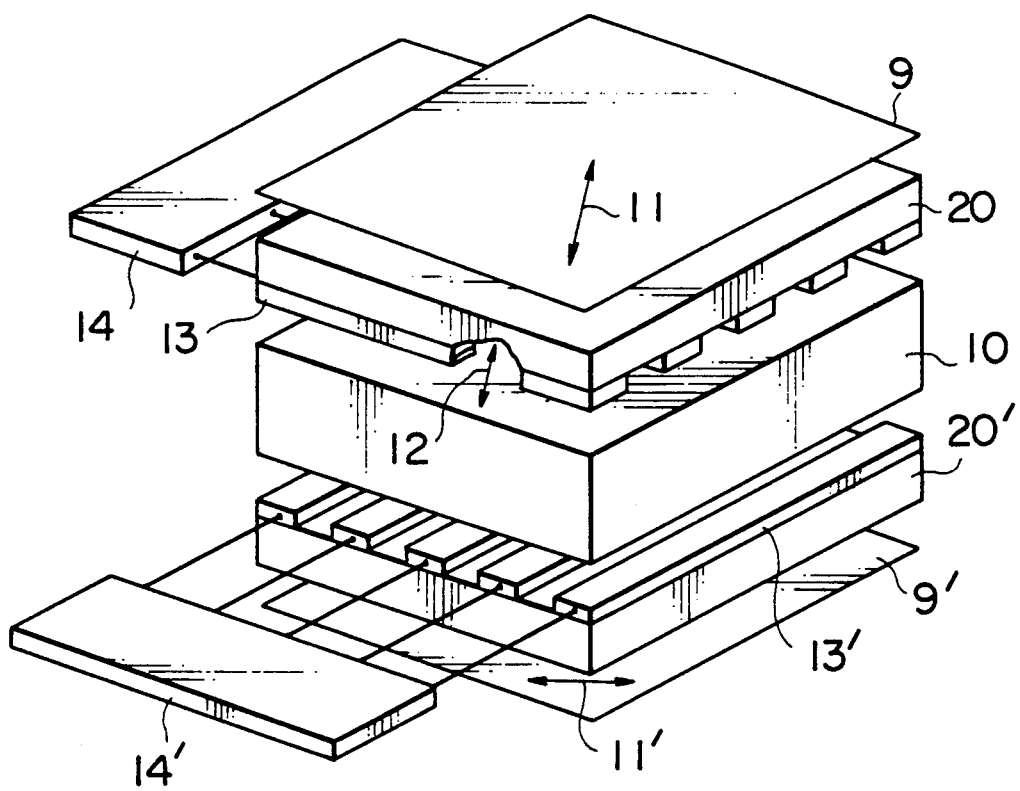
FIG. 3 is a perspective view which shows the device structure of the present invention.

FIG. 3 is a perspective view which shows the construction of the liquid crystal light modulation apparatus of the present invention, wherein a ferroelectric liquid crystal layer 10 is sandwiched between transparent substrates 20 and 20' having electrodes 13 and 13' respectively. A spacer (not shown) is provided between substrates 20 and 20' and a seal (not shown) is formed around the substrates to isolate the liquid crystal layer from the outside.

An orientation controlling film (not shown) is provided at the interface between the substrate and the liquid crystal layer and is rubbed. Polarizers 9 and 9' are arranged so as to sandwich therebetween the cell comprised of liquid crystal layer 10, electrodes 13 and 13' and substrates 20 and 20' from upper and lower sides. Polarization axes 11 and 11' are adapted to be orthogonal to each other.

Driving circuits 14 and 14' are connected to electrodes 13 and 13' so that a voltage is applied to predetermined picture elements in a given sequence. In FIG. 3, the electrodes are matrix electrodes and a voltage is applied to picture elements formed by the electrodes in a given sequence.

Figure 1A:
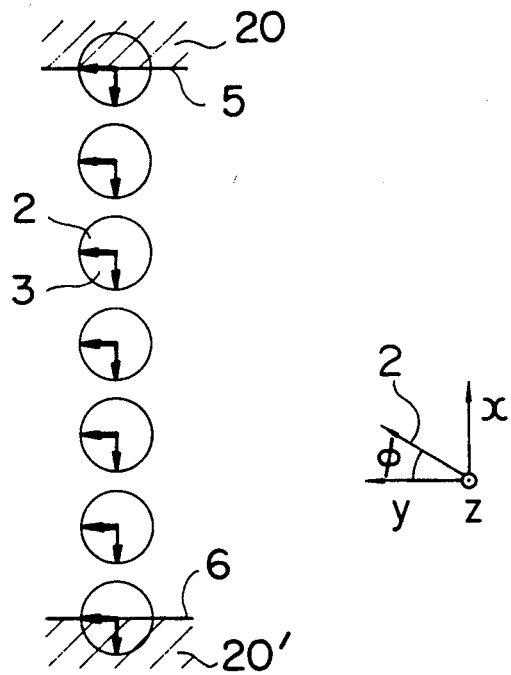
FIGS. 1(a)-1(c) are diagrams which explains the orientation state of a liquid crystal molecule and spontaneous polarization in the liquid crystal light modulation device.
Figure 1B:
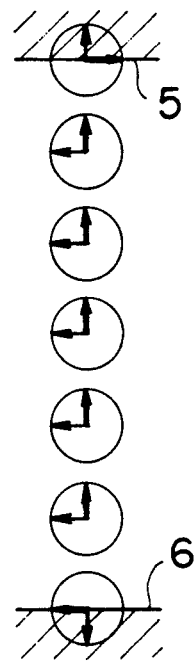
Figure 1C:
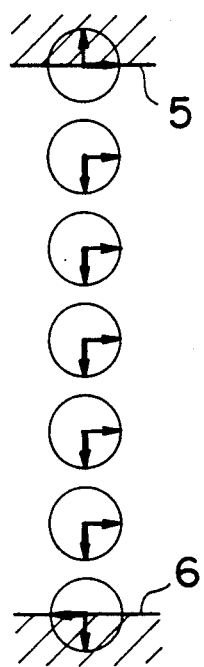

Next, the theory of the present invention will be explained referring to FIGS. 1(a)-1(c). FIGS. 1(a)-1(c) show diagrams which indicate distribution of directions of spontaneous polarization of the liquid crystal molecules between the upper and lower substrates in the liquid crystal device.

In FIGS. 1(a)-1(c) vector 2 is a vector (C-director) obtained by projecting the vector in the direction of the major axis of a molecule onto a plane which is parallel to the liquid crystal layer held between the substrates and vector 3 represents the direction of spontaneous polarization which is orthogonal to vector 2.

In the present invention, the liquid crystal molecules are weakly fixed at one interface 5 and are fixed more strongly at the other interface 6.

FIG. 1(a) shows the case where the orientation direction of molecules at interface 5 is nearly equal to that of molecules at interface 6. In this case, the orientation directions of liquid crystal molecules between the upper and lower substrates are uniform.

In FIG. 1(b) or 1(c), when an electric field having a certain amplitude and opposite in polarity to the case in FIG. 1(a) is applied to the liquid crystal layer, the spontaneous polarization of the liquid crystal molecules more weakly fixed at interface 5 are inverted whereas the spontaneous polarization of liquid crystal molecules which are fixed more strongly at interface 6 remain as they were.

In the present invention, a ferroelectric liquid crystal composition which exhibits an N* phase or an I phase just on the higher temperature side of an Sc* phase is filled in a cell which is subjected to interfacial treatment so that the molecules are fixed on one substrate and are switchable on the other substrate and the two polarization plates which sandwich the liquid crystal cell are set so that a dark state is obtained when liquid crystal molecules on the upper and lower interfaces are parallel or nearly parallel to each other. In this case, a more desirable arrangement of the polarization plates is a state where polarization axes are orthogonal to each other and the polarization axis of one polarization plate is set either parallel with or perpendicular to the direction of the major axis of a molecule at a fixed interface. The fixed interface here is an interface to which an orientation controlling film such as polyimide is applied and is subjected to a uniaxial orientation treatment such as rubbing.

In order to improve black and white contrast, when refractive index anisotropy defined by a difference in the two refractive indexes $n_e$ and $n_o$ of the above ferroelectric liquid crystal composition for light propagating perpendicular to the substrate and having a wavelength $\lambda$ is referred to as "$\Delta n$" and a cell thickness is referred to as "d", the cell gap d may be set so that the parameter $\Delta n \cdot d/\lambda$ satisfies $2.25 < d \cdot \Delta n/\lambda < 0.75$ in the region of wavelength which is used for a light modulation device.

Here, $n_e$ varies depending on the angle formed by the propagation direction of the light and the major axis of molecule and becomes maximum, namely, is equal to $n_\parallel$ when, the directions are orthogonal.

When the angle formed by the propagation direction of light and the major axis of the molecule is 0, namely, the are parallel with each other, $n_e$ becomes minimum, namely, is equal to $n_\perp$, and $\Delta n$ becomes 0.

For example, in a light modulation device for a visible light region such as a display device, 0.45 μm –0.60 μm will be sufficient as this wavelength region.

Furthermore, in order to improve black and white contrast in the thicker cell, assuming that the spontaneous polarization of the liquid crystal is indicated by Ps, the elastic constant is indicated by $B_2$, the dielectric constant in the direction perpendicular to the major axis of the liquid crystal is indicated by $\epsilon_\perp$, and the cell gap is indicated by d, the selection of the liquid crystal material and setting of the cell gap can be made so that the following formula is satisfied:

$$\frac{(P_s d)^2}{\epsilon_\perp B_2} > 3.0 \times 10^2$$

The definition and method of measurement of the above elastic constant $B_2$ will be explained below.

Hitherto, in many of the prior art inventions, an elastic constant is defined for deformation of a director (a unit vector which represents the direction of the major axis of the molecule) by analogy from nematic liquid crystal and various theories have been developed. As the elastic constant, three constants defined for deformations of splaying, twisting and bending of the director are employed and are represented by $K_1$, $K_2$, and $K_3$ in many cases.

However, according to this definition, the presence of a layer structure is ignored and it is impossible to independently generate respective deformations and there is no means to measure them. On the other hand, based on the experimental fact that various switchings occur under the presence of a layer structure and with a constant tilt angle, the present invention employs an elastic constant defined by the deformation of a C-director which is a projection of the director on the layer plane and in the same manner as above, the elastic constant is expressed by constants $B_1$, $B_2$, and $B_3$ for splaying, bending and twisting deformations, respectively. That is, $B_1$ and $B_2$ indicate rigidity against deformation in the layer and $B_3$ indicates rigidity against deformation between layers. Thus, physical meanings thereof are clear. Furthermore, both $B_1$ and $B_2$ concern deformations generated in one layer and are correlated to each other and are nearly equal to each other. Therefore, measurements of $B_2$ ($\approx B_1$) and $B_3$ are sufficient as constants for materials.

$B_3$ can be obtained by measurement of the deviation angle $\beta$ of the central axis of a monoscopic image when a D.C. field is applied to a perpendicularly oriented cell the (layer is parallel to the substrate) in parallel with the layer. If the deformation is sufficiently small, the elastic constant B3 and $\beta$ have the relation expressed by the following formula.

$$B_3 = \frac{P_s \cdot E \cdot l_o^2 \tan\theta}{8\pi^2 \beta}$$

where Ps indicates spontaneous polarization, E indicates an applied electrical field, $l_o$ indicates a helical pitch and $\theta$ indicates a tilt angle.

Ps is measured by the Soya Tower method, $l_o$ is measured by direct observation using a polarizing microscope and $\theta$ is obtained by measurement of an extinction position when a cell is placed between crossed prisms while applying positive and negative D.C. voltages to the liquid crystal. If $l_o$ is shorter than 1 μm of resolution of the microscope, it can be obtained by dividing a characteristic reflection wavelength obtained from the transmission spectrum representing an a perpendicularly oriented cell by 1.6 of average refractive index.

On the other hand, $B_2$ can be obtained as follows. A critical cell thickness dc at which a helix begins to disappear in a wedge-like cell which has been oriented in parallel (the layer is nearly perpendicular to substrate) is measured. Then, $B_2$ is obtained from the following formula using the resulting dc and $B_3$ obtained by the above method.

$$B_2 = 4(dc/l_o)^2 \cdot B_3$$

Next, explanation will be made of the action exerted by using a ferroelectric liquid crystal exhibiting a phase series of I·Sc* or N*·Sc* which is a requirement of the present invention, making a difference in the capacity of control orientation of the upper and lower substrates and fixing the liquid crystal at one of the substrates and making it switchable it at the other substrate.

Molecules of a liquid crystal having a phase series of I·Sc* or N*·Sc* are strongly fixed at an interface between the liquid crystal and one of substrates which is provided with an orientation film such as polyimide and then subjected to a treatment to control uniaxial orientation to the liquid crystal molecules such as rubbing. There is less orientation control over the other substrate, for example, when there is no such treatment as described. When the cell comprising these substrates and liquid crystal is gradually cooled by applying an electric field which can stabilize the orientation direction at the former substrate, thereby to form an Sc* phase, the orientation parallel with the rubbing direction obtained in the gradual cooling is further stabilized and the orientation obtained when an opposite polarity electric field is applied is relatively unstabilized.

The difference in stability of these two orientations can be controlled by the degree of difference in orientation controllability given to the upper and lower substrates. (When the difference in the capacity to control orientation of the upper and lower substrates is suitably controlled, only the orientation state in the gradual cooling is stably realized in the absence of electric field whereas the orientation obtained when the opposite polarity electric field is applied becomes unstable.) Thus, when the electric field is removed after application of the opposite polarity, electric field, the orientation state changes to a splaying state where directions of polarization vectors are nearly opposite on both the substrates. Such a splaying state is more easily produced and is more stable with an increase of the cell thickness. In this cell, stability of a nearly uniform orientation in the rubbing direction is enhanced by gradual cooling and formation of an Sc* phase under the control of orientation and application of an electric field and further stability of the splaying state is enchanced by increasing the cell thickness.

By the above-mentioned actions, a stable ferroelectric liquid crystal device can be obtained even with a thick cell where the two orientation states of nearly uniform orientation state (a) in the rubbing direction and splaying state (b) or (c) show twin stable states as shown in FIGS. 1(a)-1(c).

As components of a composition having a phase series which shows an N* phase or an isotropic phase I just on the higher temperature side of an SC* phase, compounds which take no $S_A$ phase as shown below are effective.

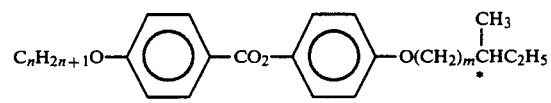

where n is 8 or 9 when m=3 and is 7, 8, 9, or 10 when m=5.

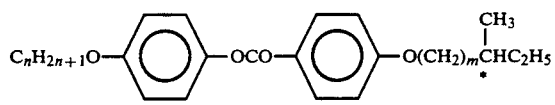

where n is 6, 7, 8, 9, or 10 when m=3 and is 7, 8, 9, or 10 when m=5.

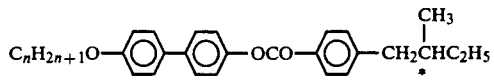

where n is 6, 7, 8, 9, 10, or 12.

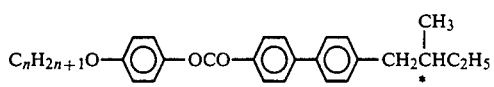

where n is 5, 6, 7, 8, 9, or 10.

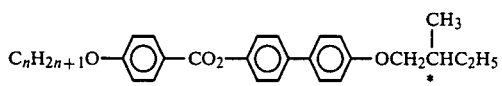

where n is 7, 8, 9, or 10.

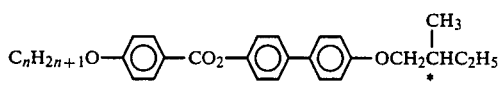

where n is 7, 8, 9, or 10.

Compounds effective in the present invention are enumerated above, but are not limited to the above and those which take no $S_A$ phase are effective.

The following is an explanation of why both the contrast ratio and black and white contrast in a thick cell can be improved by increasing the parameter $(P_s d)^2/\epsilon_\perp B_2$ and imparting contrast with two polarization plates having polarizing axes which cross each other.

By using the means to attain the above-mentioned constructive requirements, a ferroelectric liquid crystal device is obtained where the state in which major axes of molecules are oriented nearly uniformly and in parallel with the rubbing direction and the splaying state are stably present.

Figure 2:
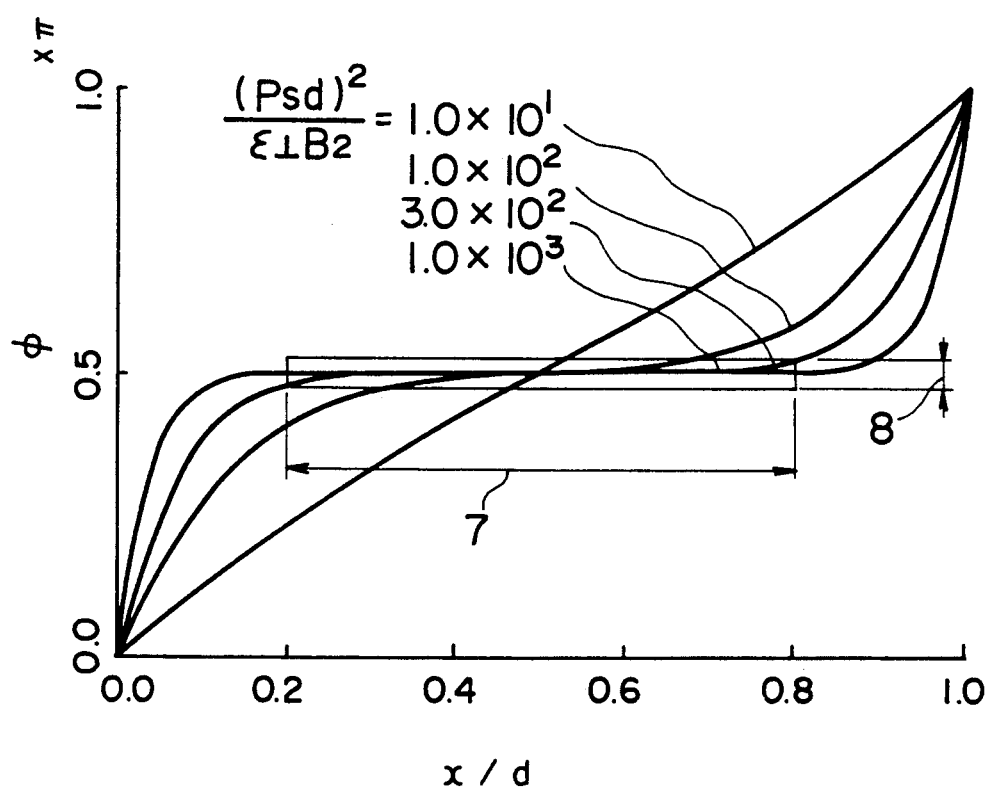
FIG. 2 is a graph which shows the relation between the values of properties and the deformation state.

In the latter splaying state, if the parameter $(P_s d)^2/\epsilon_{195} B_2$ which shows the ratio of torque based on electrical bonding and elastic torque is increased, an area is produced (the area surrounded by 7 and 8 in FIG. 2) where the azimuth $\phi$, which is defined as the angle between the y axis and the C-director (see FIG. 1(a), is constant at $\pi/2$ in the central portion of a cell due to a polarization field effect formed by spontaneous polarization as shown in FIG. 2 and the proportion thereof in the whole cell increases. FIG. 2 shows a distribution of the azimuth in the direction of cell thickness obtained from the theory of continuum of liquid crystal when only a change of azimuth in the the direction of cell thickness is considered.

From the result, it can be seen that in order that azimuth is $\pi/2 \pm 5\%$ in at least 60% of the whole cell thickness, the following formula should be satisfied:

$$\frac{(P_s d)^2}{\epsilon_\perp B_2} > 3.0 \times 10^2$$

It is considered that the cell of the present invention where the above conditions are satisfied shows the bistable states of a state where the azimuth is nearly uniform at 0 or $\pi$ and a state where the azimuth is nearly uniform at $\pi/2$ (or $-\pi/2$).

This cell of the present invention and the conventional cell which includes the two states where the azimuth is nearly uniform at 0 and $\pi$, namely, twin stable states where major axes of liquid crystal molecules are parallel with an interface are compared in contrast ratio and black and white contrast when the contrast is imparted using two polarization plates whose polarization axes cross each other.

With reference to the contrast ratio, theoretically they are the same except that the maximum contrast in the present invention can be obtained at a tilt angle of 45° which is twice that of the conventional cell, and according to the cell of the present invention, a high contrast ratio such as 10 or higher which is nearly equal to that obtained by the conventional birefringence mode can be obtained by using a liquid crystal of a large tilt angle (for example, 45°).

With reference to the black and white contrast, in the case where contrast is imparted by using two polarization plates 9 and 9' whose polarization axes cross each other as shown in FIG. 3, a product of the refractive index anisotropy $\Delta n$ and the cell thickness d or $\Delta n \cdot d \kappa 0.28$ μm is known as a condition for black and white display. This is a condition under which a phase difference $\pi d \cdot \Delta n/\lambda$ between two lights (ordinary light and extraordinary light) in liquid crystal is $\pi/2$ for a light of 0.56 μm in wavelength to which eyes are the most sensitive. In the conventional memory devices, since display is conducted at the two states where major axes of liquid crystal molecules are parallel with an interface and hence the value of refractive index anisotropy $\Delta n$ equals the difference per se between the refractive index $n_{81}$ to the light oscillating in the direction of the major axis of liquid crystal molecules and the refractive index $n_{195}$ in the perpendicular direction and this value is generally about 0.10–0.20. Realization of display in black and white with a cell of the greater thickness can be attained by using a material of the lower value of $n_{81}-n_{195}$, but there is a limitation in reduction of this value and this value can be reduced to about 0.10 at the most. Therefore, an upper limit of cell thickness is about 2.8 μm.

In the present invention, when dark display is effected under the two stable states, a propagation direction of light and a liquid crystal molecule are at right angles to each other, namely, a liquid crystal molecule and an interface are parallel with each other, while when a bright display is effected, the liquid crystal molecule is tilted to the interface and the refractive index $n_e(\theta_t)$ of the extraordinary light is closer to the refractive index $n_o$ ($=n_{195}$) of ordinary light and as shown by the following formula, the apparent refractive index decreases corresponding to the degree of the tilting.

$$\Delta n = n_e(\theta_t) - n_o = \frac{n_\| n_\perp}{(n_\|^2 \sin^2\theta_t + n_\perp^2 \cos^2\theta_t)^{\frac{1}{2}}} - n_\perp$$

where $\theta_t$ represents an angle formed by the major axis of liquid crystal molecule and the interface and can be expressed in terms of the tilt angle $\theta$ and the azimuth $\phi$ as shown by the following formula.

$$\theta_t = \sin^{-1}(\sin\theta \sin\phi)$$

In the present invention, $\phi = \pi/2$ and $\theta_t = \theta$ and in the conventional method, $\phi = 0$ or $\pi$ and $\theta_t = 0$.

Figure 4:
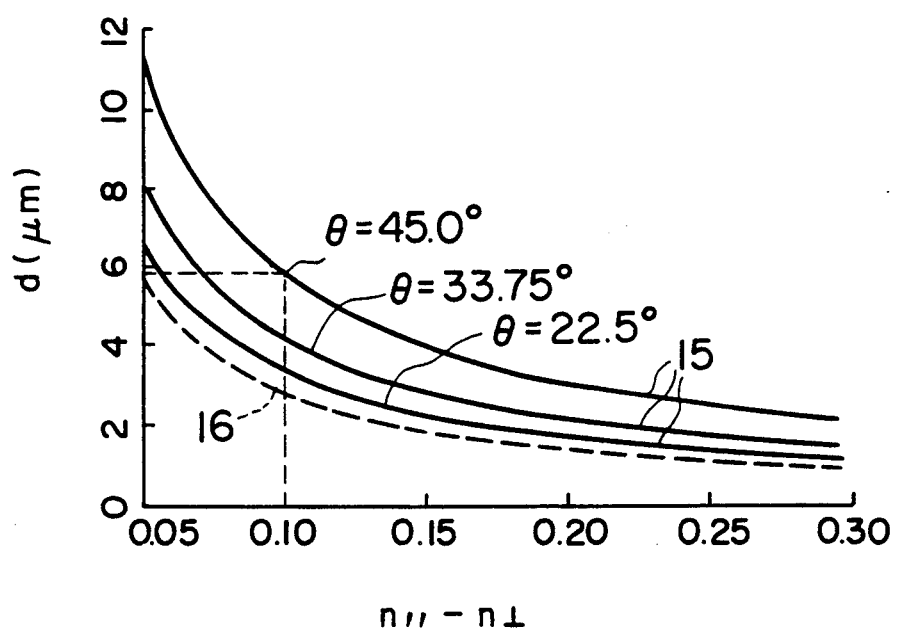
FIG. 4 is a graph which shows relations among tilt angle $\theta$, anisotropy of refractive index $n_\parallel - n_\perp$ and optimum cell thickness d.

Next, the degree of increase in thickness of a cell which can be attained by the tilting of liquid crystal molecules from the interface will be explained by FIG. 4. FIG. 4 shows the optimum cell gap for display in black and white calculated in the case of $n_{195}$ being 1.5, assuming that the volume of the deformed portion near the interface of cell is sufficiently small as compared with the volume of the central portion of the cell where the azimuth is constant at $\pi/2$ and can be ignored. A cell gap suitable for display in black and white becomes thicker with the increase in tilt angle $\theta$ and the decrease in $n_{81} - n_\perp$ which is the refractive index anisotropy of the liquid crystal. The increase of optimum cell gap resulting from increase of $\theta$ is an effect of the present invention and when a liquid crystal material of $\theta = 45°$ is used, the optimum cell gap can be increased twice or more as much as that attained by the conventional method. For example, when a liquid crystal material of $n_{195} = 1.5$, $n_\parallel - n_{195} = 0.10$ and $\theta = 45°$ is used, the optimum cell gap is about 5.9 $\mu$m and production of the cell becomes easier. Furthermore, even if the cell gap varies, the change of color is relatively small and substantially no unevenness in color occurs.

The present invention is effective not only for light modulation devices for visible light as explained above, but also for light modulation devices for ultraviolet light and infrared light. For all of these devices, the change in light transmission is small over a wide wavelength region and the change in light transmission is also small relative to the change of cell gap.

In order that transmission for lights of all wavelengths in the wavelength region usable for the device exceed 50% of the maximum value, the cell gap and other parameters can be set so as to satisfy the following formula.

$$0.25 < d \cdot \Delta n < 0.75$$

Owing to the above-mentioned actions, compatibility of high contrast ratio and high black and white contrast with each other becomes possible with a thick cell (3 $\mu$m or more) according to the present invention.

EXAMPLE 1

A polyimide orientation controlling film (PIQ varnish, manufactured by Hitachi Chemical Co., Ltd.) was spin coated on one of two glass substrates which were provided with indium oxide transparent electrodes. This coat was cured by heating and subjected to rubbing treatment. The thickness of this film was about 100Å measured by an ellipsometer manufactured by Mizojiri Kogakukogyosho Co., Ltd. A liquid crystal cell was fabricated by providing the two substrates at an interval of 3.2 $\mu$m using glass fiber powders as a spacer and was filled under vacuum with the following liquid crystal composition.

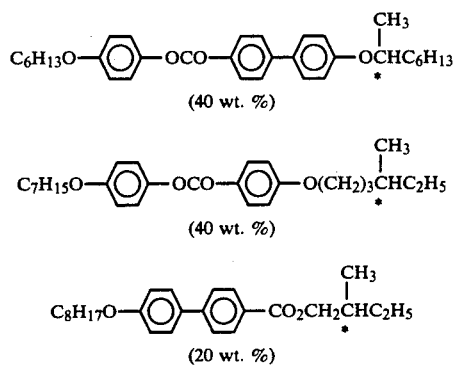

(40 wt. %)

(40 wt. %)

(20 wt. %)

Phase series of the above composition is as follows.

| Phase transition temperature | | 5° C. | | 61° C. | | 85° C. |
|---|---|---|---|---|---|---|
| Phase | Crystal | ~ | Sc* | ~ | N* | ~ | I |

At room temperature, this composition had a tilt angle of 32°, a spontaneous polarization of 41 nC/cm$^2$, an elastic constant $B_2$ of $0.8 \times 10^{-10}$N, and a refractive index anisotropies $n_{81} - n_\perp$ of 0.160 for monochromatic light of 0.60 $\mu$m in wavelength and 0.185 for monochromatic chromatic light of 0.45 $\mu$m.

After this composition was enclosed in the cell under the vacuum, the cell was once heated to 61° C. or higher and then slowly cooled to the room temperature at a rate of about 0.5° C./min under application of a D.C. voltage of 20 V. Then, this device was inserted between two polarizing plates and one of the polarizing plates was set nearly parallel with the rubbing direction (shifted about 10° which corresponds to a change of tilt angle with temperature) and the other polarizing plate was set so that the polarizing axis thereof was nearly perpendicular to that of the above polarizing plate. The resulting device was applied with a pulse voltage of the same polarity as applied above during the slow cooling and of 2 ms in width and of 40 V in crest value and thereafter light transmission was measured with no voltage applied for monochromatic light of three colors of 0.45 $\mu$m, 0.55 $\mu$m, and 0.60 $\mu$m. The transmission was 5% or less for all of the three colors. Then, a similar pulse width but with an opposite polarity was applied and as a result spontaneous polarization of the molecules occured, and the molecules were inverted at the interface, which was not subjected to rubbing treatment.

Similarly, light transmission was measured for light of 0.40–0.70 $\mu$m in wavelength. The transmission was maximum at around 0.60 $\mu$m and was 73%, 87%, and 100% for the lights of 0.45 $\mu$m, 0.55 $\mu$m, and 0.60 $\mu$m, respectively, and a contrast ratio of 10 or more was obtained. Furthermore, visual observation under white light from a tungsten lamp revealed a sufficiently white color.

EXAMPLE 2

Figure 5A:
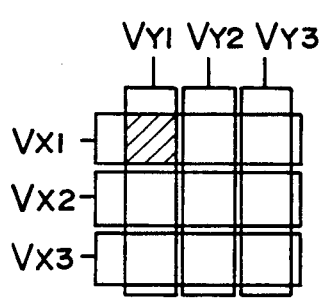
FIG. 5(a) shows a construction of a matrix and FIG. 5(b) is a graph which shows driving waveforms.
Figure 5B:
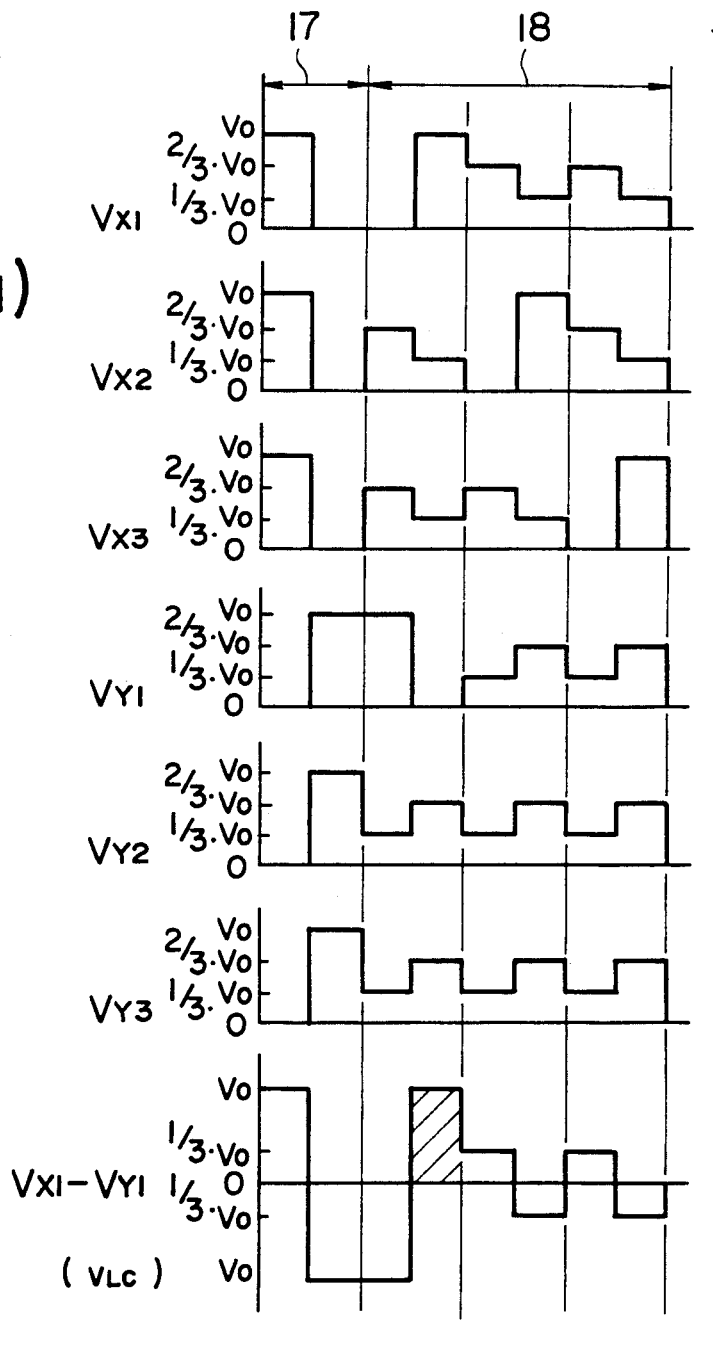

A device having the same construction as in Example 1 except that only the structure of the electrode was in the form of 3×3 matrix as shown in FIG. 5(a) was applied with a voltage having a waveform as shown in FIG. 5(b). First, during the initialization period 17, all of the picture elements were kept in a uniform state and during a scanning period 18, time was allocated to the respective scanning electrodes $V_{x1}$, $V_{x2}$ and $V_{x3}$ and a differential voltage from the waveform carrying signal information from each of signal electrodes $V_{y1}$, $V_{y2}$ and $V_{y3}$ was obtained for every line and written in succession. The driving waveform shown in FIG. 5 was set so that a pulse voltage applied when writing was made on other lines is $V_o/3$ if the voltage at switching is referred to as $V_o$. Here, the pulse voltage of $V_o$ was set to be 15 V, application of which inverts only the molecules weakly fixed on the interface and does not invert the molecules strongly fixed on the interface. As a result, a black and white display was obtained in respective picture elements.

COMPARATIVE EXAMPLE

Example 1 was repeated except that interface treatments were the same in upper and lower interfaces. Concentration of PIQ varnish was 1/10 that of PIQ varnish in Example 1 and was in the form of a very thin film. In this device, dependency of transmission on wavelength at a bright state was high and the transmission showed a maximum value with light of about 0.40 μm in wave-length and a minimum value at about 0.51 μm, which was less than 5% of the maximum value. Purple light was observed with white light from a tungsten lamp.

According to the present invention, stable memory properties can be imparted in a thick cell of at least 3 μm. Furthermore, it becomes possible for a high contrast ratio and a high black and white contrast to be compatible with each other, whereby a display quality of the liquid crystal light modulation device can be enhanced.

What is claimed is:

1. A liquid crystal light modulation device comprising:
    a cell including a pair of substrates at least one of which is transparent and which have electrodes and are opposed through a spacer;
    a ferroelectric liquid crystal layer which is enclosed in said cell and which has a phase series in which one of a nematic phase and an isotropic phase occurs on just a higher temperature side of a ferroelectric phase; and
    two polarizing plates which sandwich the cell therebetween;
    wherein liquid crystal molecules at one interface between the liquid crystal layer and one of the substrates are fixed to the one substrate more weakly than liquid crystal molecules at another interface between the liquid crystal layer and the other substrate are fixed to the other substrate, wherein the weakly fixed liquid crystal molecules are weakly fixed to such an extent that inversion of spontaneous polarization of the weakly fixed liquid crystal molecules occurs upon application of an electrical field to the liquid crystal layer through the electrodes;
    wherein an orientation direction of the liquid crystal molecules at the one interface and an orientation direction of the liquid crystal molecules at the other interface can assume either one of a state (a) in which the orientation directions are substantially parallel with each other and a state (b) in which the orientation directions cross each other upon the inversion of the spontaneous polarization; and
    wherein the two polarizing plates are arranged such that a light transmittance of said cell is lower in the state (a) than in the state (b).

2. A liquid crystal light modulation apparatus comprising:
    a cell including a pair of substrates at least one of which is transparent and which have electrodes defining picture elements and are opposed through a spacer;
    a ferroelectric liquid crystal layer which is enclosed in said cell and which has a phase series in which one of a nematic phase and an isotropic phase occurs on just a higher temperature side of a ferroelectric phase;
    two polarizing plates which sandwich the cell therebetween; and
    means for selectively applying an electrical field to the picture elements through the electrodes;
    wherein liquid crystal molecules at one interface between the liquid crystal layer and one of the substrates are fixed to the one substrate more weakly than liquid crystal molecules at another interface between the liquid crystal layer and the other substrate are fixed to the other substrate, wherein the weakly fixed liquid crystal molecules are weakly fixed to such an extent that inversion of spontaneous polarization of the weakly fixed liquid crystal molecules occurs upon application of an electrical field to the liquid crystal layer through the electrodes;
    wherein an orientation direction of the liquid crystal molecules at the one interface and an orientation direction of the liquid crystal molecules at the other interface can assume either one of a state (a) in which the orientation directions are substantially parallel with each other and a state (b) in which the orientation directions cross each other upon the inversion of the spontaneous polarization; and
    wherein the two polarizing plates are arranged such that a light transmittance of said cell is lower in the state (a) than in the state (b).

3. A liquid crystal light modulation apparatus according to claim 2, wherein the electrodes are matrix electrodes and there is provided means to apply to selected picture elements a voltage for switching the state of low light transmittance to the state of high light transmittance, the voltage being higher than the voltage for inversion of spontaneous polarization of the molecules on the interface to which the molecules are more weakly fixed and is lower than a threshold voltage for inversion of spontaneous polarization of the molecules on the interface to which molecules is more strongly fixed.

4. A liquid crystal light modulation apparatus according to claim 2, wherein a refractive index anisotropy defined by a difference between two refractive indexes $n_{3e}$ and $n_o$ of the ferroelectric liquid crystal to a light propagating vertically to the substrate and having a wavelength $\lambda$ is denoted by $\Delta n$ and a cell gap is denoted by $d$, the cell gap satisfies the following formula in the wavelength region of using the light moleculation device:

$$0.25 < d \cdot \Delta n / \lambda < 0.75.$$

5. A liquid crystal light modulation apparatus according to claim 3 or 4, wherein the wavelength region is expressed in the following formula:

$$0.45 \ \mu m \leq \lambda \leq 0.60 \ \mu m.$$

6. A liquid crystal light modulation apparatus according to claim 2, 3 or 4, wherein spontaneous polarization of a liquid crystal is denoted by $P_s$, elasticity constant is denoted by $B_2$, dielectric constant in the direction perpendicular to the major axis of liquid crystal molecules is denoted by $\epsilon_{19S}$, and cell gap is denoted by $d$, the following condition is satisfied:

$$\frac{(P_s d)^2}{\epsilon_\perp B_2} > 3.0 \times 10^2$$

7. A liquid crystal light modulation apparatus according to claim 2, 3, or 4, wherein the average direction of major axes of the liquid crystal molecules at either of the two interfaces in the state when the two polarizing plates are set so as to further decrease the light transmittance is substantially parallel or substantially perpendicular to the electric vector of the light which passes through one of the two polarizing plates.

8. A liquid crystal light modulation device comprising:

- a cell including a pair of substrates at least one of which is transparent and which have electrode sand are opposed through a spacer;
- a ferroelectric liquid crystal layer which is enclosed in said cell and which has a phase series in which one of a nematic phase and an isotropic phase occurs on just a higher temperature side of a ferroelectric phase; and
- two polarizing plates for controlling a light transmittance of said cell;
- wherein liquid crystal molecules at one interface between the liquid crystal layer and one of the substrates are fixed to the one substrate more weakly than liquid crystal molecules at another interface between the liquid crystal layer and the other substrate are fixed to the other substrate, wherein the weakly fixed liquid crystal molecules are weakly fixed to such an extent that inversion of spontaneous polarization of the weakly fixed liquid crystal molecules occurs upon application of an electrical field to the liquid crystal layer through the electrodes;
- wherein an orientation direction of the liquid crystal molecules at the one interface and an orientation direction of the liquid crystal molecules at the other interface can assume either one of a state (a) in which the orientation directions are substantially parallel with each other and a state (b) in which the orientation directions cross each other upon the inversion of the spontaneous polarization; and
- wherein the two polarizing plates are arranged such that a light transmittance of said cell is lower in the state (a) than in the state (b).

9. A liquid crystal light modulation apparatus comprising:

- a cell including a pair of substrates at least one of which is transparent and which have electrodes defining picture elements and are opposed through a spacer;
- a ferroelectric liquid crystal layer which is enclosed in said cell and which has a phase series in which one of a nematic phase and an isotropic phase occurs on just a higher temperature side of a ferroelectric phase;
- two polarizing plates for controlling a light transmittance of said cell; and
- means for selectively applying an electrical field to the picture elements through the electrodes;
- wherein liquid crystal molecules at one interface between the liquid crystal layer and one of the substrates are fixed to the one substrate more weakly than liquid crystal molecules at another interface between the liquid crystal layer and the other substrate are fixed to the other substrate, wherein the weakly fixed liquid crystal molecules are weakly fixed to such an extent that inversion of spontaneous polarization of the weakly fixed liquid crystal molecules occurs upon application of an electrical field to the liquid crystal layer through the electrodes;
- wherein an orientation direction of the liquid crystal molecules at the one interface and an orientation direction of the liquid crystal molecules at the other interface can assume either one of a state (a) in which the orientation directions are substantially parallel with each other and a state (b) in which the orientation directions cross each other upon the inversion of the spontaneous polarization; and
- wherein the two polarizing plates are arranged such that a light transmittance of said cell is lower in the state (a) than in the state (b).

* * * * *